3,051,744
CARBAMIC ACID ESTERS
Albert Bowers, Mexico City, Mexico, assignor, by mesne assignments, to Syntex Corporation, a corporation of Panama
No Drawing. Filed Mar. 14, 1960, Ser. No. 14,544
Claims priority, application Mexico Oct. 7, 1959
9 Claims. (Cl. 260—482)

The present invention relates to novel dicarbamates of 1,3-propanediols and a method for the production thereof.

More particularly the invention relates to dicarbamates of 1,3-propanediols substituted at C–2 with a fluorine atom as well as with a hydrocarbon radical.

The novel compounds of the present invention are valuable tranquilizers which are effective for a longer duration of time than the corresponding compounds without a fluorine atom at C–2.

The new compounds of the present invention are illustrated by the following formula:

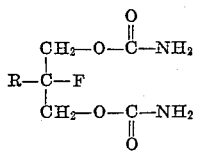

In the above formula, R represents an aliphatic hydrocarbon, an aromatic hydrocarbon or an araliphatic hydrocarbon containing up to 8 carbon atoms. Typical of such hydrocarbon radicals are ethyl, methyl, n-propyl, isobutyl, phenyl and benzyl groups.

The novel compounds of the present invention are prepared by a process illustrated by the following equation:

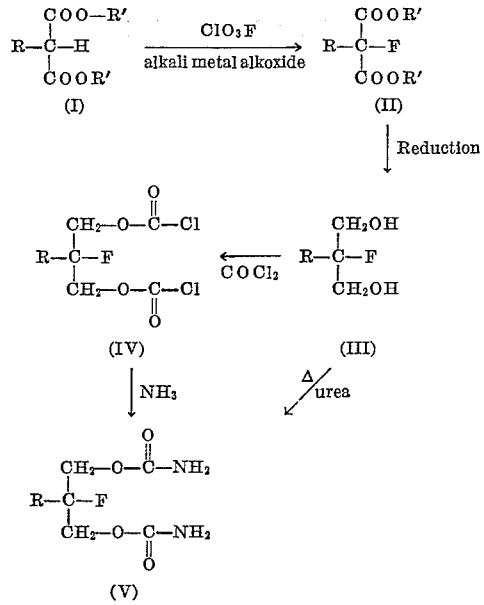

In the above formulae, R has the same meaning as set forth previously; R′ is lower alkyl.

In practicing the process outlined above, a dialkyl ester, preferably a diethyl ester, of a 2-hydrocarbon substituted malonic acid is used as the starting material (I). Among the typical compounds which serve as the starting material are diethyl esters of N-propyl malonate, isobutyl malonate, ethyl malonate, benzyl malonate and the like. The ester (I) is reacted with perchloryl fluoride in the presence of 1 molar equivalent of an alkali metal alkoxide such as sodium ethoxide, potassium methoxide or any other alkoxide of an alkali metal formed with a lower aliphatic alcohol. The reaction is conducted at room temperature and preferably in a solvent such as an alkanol, an aromatic hydrocarbon or a halogenated hydrocarbon. Typical suitable solvents are menthanol, ethanol, n-propanol, benzene, toluene, chlorbenzene and similar type solvents. The thus formed monofluorinated malonates (II) are reduced to the corresponding diols (III) by treatment with a double metal hydride such as lithium aluminum hydride in a solvent such as tetrahydrofuran, ethyl ether or dioxane. The alcohols (III) are then reacted with phosgene to form the corresponding chloroformic esters (IV) which upon reaction with ammonia are converted into the novel dicarbamates of 2-fluoro-2-hydrocarbon substituted-1,3-propanediol.

In another aspect of this invention, the 2-fluoro-1,3-propanediols (III) are condensed with urea in an inert organic solvent such a diethyleneglycol dimethyl ether to form the novel dicarbamates of 2-fluoro-2-hydrocarbon substituted-1,3-propanediols. The 2-fluoro-1,3-propanediols (III) may also be reacted with carbamyl chloride in the conventional manner or with ethyl urethane in the manner disclosed in Danish Patent 86,257 to give in one step the novel dicarbamates of 2-fluoro-2-hydrocarbon substituted 1,3-propanediols.

Alternatively, the novel compounds may be prepared by starting with a dialkyl ester of a 2-alkyl-2-iodo malonic acid, such as the diethyl ester of 2-ethyl-2-iodo-malonic acid. In this case, there is an interchange of the iodine by fluorine by reaction of the 2-iodo compound with silver fluoride in aqueous acetonitrite to form the intermediate 2-fluoro compound (III) or more particularly, the diethyl ester of 2-fluoro-2-ethyl-malonic acid.

The following examples serve to illustrate but are not intended to limit the present invention:

*Example 1*

A solution of 4 g. of the diethyl ester of n-propyl-malonic acid in 400 cc. of ethanol was treated with a solution of 1.1 molar equivalents of sodium methoxide in 80 cc. of methanol; a stream of perchloryl fluoride was then introduced into the solution for 1 hour, under continuous stirring at room temperature. The mixture was then concentrated to a small volume under reduced pressure, diluted with water and the product was extracted with methylene chloride; the extract was washed with water, dried over anhydrous sodium sulfate, the solvent was evaporated and the residue was purified by distillation under reduced pressure. There was thus obtained the diethyl ester of 2-n-propyl-2-fluoro-malonic acid.

To a suspension of 1 g. of lithium aluminum hydride in 80 cc. of absolute tetrahydrofurane was added a solution of 2 g. of the diethyl ester of 2-fluoro-2-n-propyl-malonic acid in 100 cc. of anhydrous tetrahydrofurane and the mixture was refluxed for 15 minutes. Water was cautiously added to decompose the excess of hydride, the mixture was acidified with dilute hydrochloric acid, 50 cc. more of water and 200 cc. of ethylacetate were added and the organic layer was separated; it was washed with water to neutral, dried over anhydrous sodium sulfate, the solvent was evaporated under reduced pressure and the residue was purified by distillation under reduced pressure thus yielding 2-n-propyl-2-fluoro-propane-1,3-diol.

To a mixture of 1 g. of the above compound and 70 cc. of benzene was added a solution of 10 g. of phosgene in 70 cc. of benzene, little by little, with stirring and maintaining the temperature around 20° C. The mixture was stirred for 1 hour further and then a mixture of 10 cc. of dimethylaniline and 20 cc. of benzene was added; after stirring for half an hour longer at room temperature the mixture was finally treated with ice and water. It was then filtered, the organic layer containing the chloroformic diethyl ester (ClOCOCH$_2$—CF.CH$_2$CH$_2$CH$_3$—CH$_2$OCOCl)

was separated and stirred with 100 cc. of concentrated ammonia at 5° C. for 6 hours, at the end of which the precipitate was collected by filtration and recrystallized from water. There was thus obtained the desired dicarbamate of 2-n-propyl-2-fluoro-propane-1,3-diol.

Example 2

In accordance with the method described in Example 1, there was prepared another gram of 2-n-propyl-2-fluoro-propane-1,3-diol which was added to a solution of 2 g. of phosgene in 15 cc. of toluene, little by little and under stirring. There was then slowly added 6 g. of antipyrine dissolved in chloroform at 20° C.; the antipyrine hydrochloride formed was removed by filtration and the filtrate was saturated with ammonia gas, poured into ice water and the solid was collected by filtration and washed with water, thus furnishing the dicarbamate of 2-n-propyl-2-fluoro-propane-1,3-diol, identical with the compound prepared in accordance with Example 1.

Example 3

In accordance with the methods of the preceding examples the diethyl ester of ethylmalonic acid was converted finally into the dicarbamate of 2-ethyl-2-fluoropropane-1,3-diol.

Example 4

In accordance with the methods described in Examples 1 and 2 the diethyl ester of isobutylmalonic acid was converted finally into the dicarbamate of 2-isobutyl-2-fluoro-propane-1,3-diol.

Example 5

In accordance with the methods of Examples 1 and 2 the diethyl ester of phenylmalonic acid was converted into the dicarbamate of 2-phenyl-2-fluoro-propane-1,3-diol.

Example 6

In accordance with the methods of Examples 1 and 2 the diethyl ester of benzylmalonic acid was converted into the dicarbamate of 2-benzyl-2-fluoro-propane-1,3-diol.

Example 7

A mixture of 10 g. of 2-ethyl-2-fluoro-propane-1,3-diol, 15 g. of urea and 50 cc. of diethyleneglycol dimethyl ether was heated in a sealed tube during 3 hours at 140°–150° C. After cooling, the product was poured into water, extracted with ethyl acetate, washed with water, dried over anhydrous sodium sulfate and concentrated until crystallization occurred. There was thus obtained the dicarbamate of 2-ethyl-2-fluoro-propane-1,3-diol.

I claim:

1. A compound of the formula:

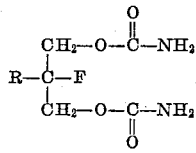

wherein R is selected from the group consisting of alkyl, aryl and aralkyl radicals each of said radicals containing up to 8 carbon atoms.

2. 2-lower alkyl-2-fluoro-propane-1,3-diol dicarbamate.
3. 2-n-propyl-2-fluoro-propane-1,3-diol dicarbamate.
4. 2-ethyl-2-fluoro-propane-1,3-diol dicarbamate.
5. 2-isobutyl-2-fluoro-propane-1,3-diol dicarbamate.
6. 2-monocyclic aryl-2-fluoro-propane-1,3-diol dicarbamate in which the monocyclic aryl group contains up to 8 carbon atoms.
7. 2-phenyl-2-fluoro-propane-1,3-diol dicarbamate.
8. 2-aralkyl-2-fluoro-propane-1,3-diol dicarbamate in which the aralkyl group contains up to 8 carbon atoms.
9. 2-benzyl-2-fluoro-propane-1,3-diol-dicarbamate.

No references cited.